Feb. 14, 1961  R. GADDIS  2,971,769
TOWING DOLLY
Filed April 16, 1959
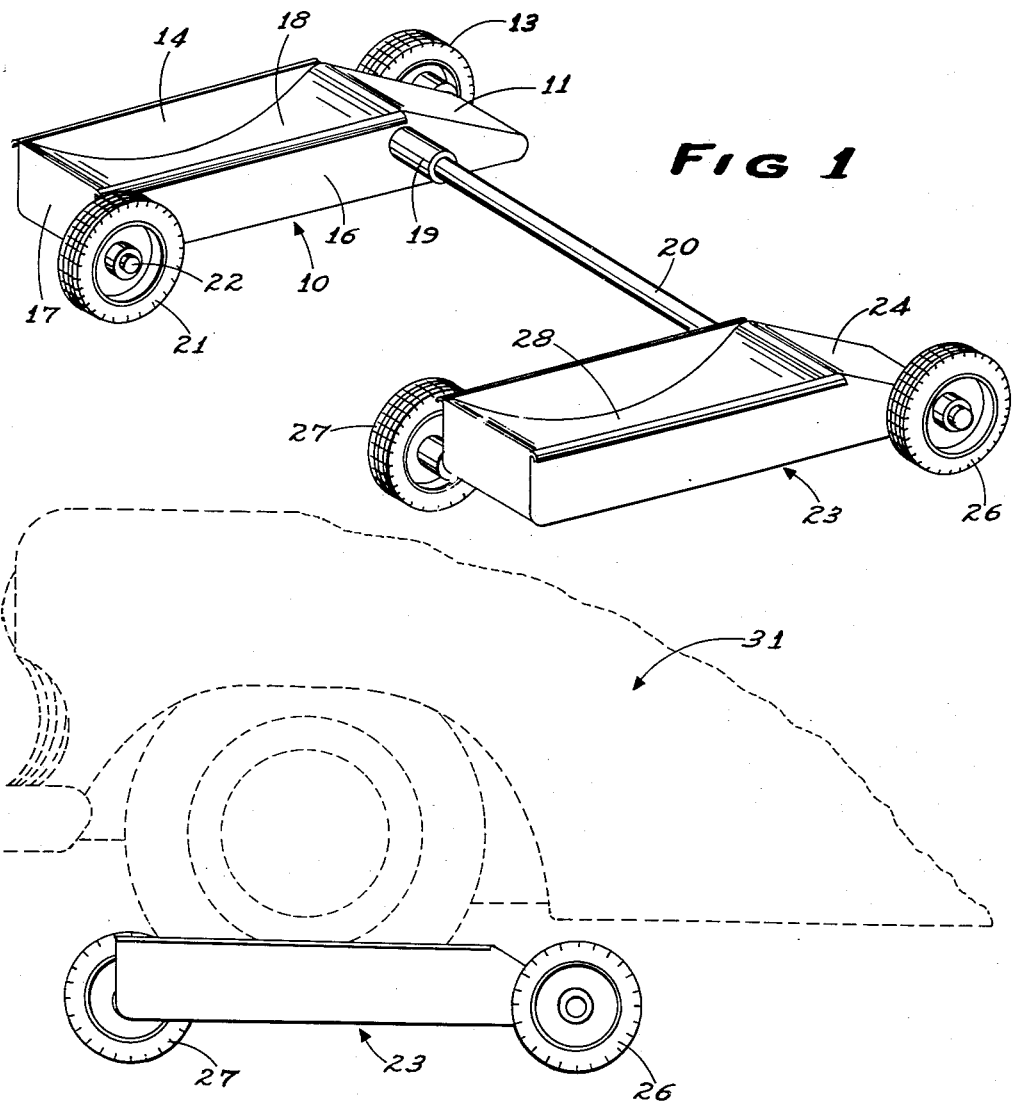
INVENTOR.
Roy Gaddis
BY
ATTORNEY

United States Patent Office 2,971,769
Patented Feb. 14, 1961

2,971,769
TOWING DOLLY
Roy Gaddis, 2672 1st Ave. W., Cedar Rapids, Iowa
Filed Apr. 16, 1959, Ser. No. 806,860
1 Claim. (Cl. 280—79.1)

This invention relates in general to dollies and in particular to a dolly for towing motor vehicles.

It is oftentimes necessary to tow disabled autos by wrecker. The present invention consists of a dolly which can be placed under two of the vehicle's wheels. The other two wheels may then be picked up by the wrecker and the vehicle towed down the road.

It is an object of this invention, therefore, to provide a dolly that need not be locked to the wheels of a vehicle during towing.

Another object of this invention is to provide an adjustable dolly which may be adapted to fit any auto.

Still another object is to provide a dolly that can be quickly and easily disassembled and assembled.

Yet another object is to provide a dolly with wheels staggered to more efficiently distribute the load.

A feature of this invention is found in the provision for a dolly with two portions for holding the wheels of an auto and with wheels mounted on either side and the two portions detachably connected together by a shaft receivable in receptacles mounted on the portions.

Further features, objects, and advantages of this invention will be found in the following description and claim, when read in view of the drawing, in which:

Figure 1 is a perspective view of the dolly of this invention, and

Figure 2 is a side view showing the dolly in use.

Figure 1 shows the dolly of this invention. A pair of wheel holding portions 10 and 23 are detachably connected together by a shaft 20.

The portion 10 has sidewalls 14 and 16 which are curved outwardly at the top. The bottom 18 is curved to receive an auto wheel. The rear wall 17 is vertical and the front portion 11 extends forwardly and downwardly.

Ground wheels 13 and 21 are mounted on opposite corners of portion 10. An axle 22 is shown which supports wheel 21. The axle for wheel 13 is not visible in Figure 1. The axles are attached to main body of portion 10.

A shaft guide 19 is attached to the side wall 16 of portion 10 and deachably receives one end of shaft 20. The opposite end of shaft 20 is received in a shaft guide which is detachably attached to portion 23.

Portion 23 has ground wheels 26 and 27 attached to opposite corners. The front 24 slopes forwardly and downwardly. A pocket 28 is formed in portion 23 to receive one of the wheels of the vehicle.

As illustrated air tires may be used to make the dolly ride soft. Suitable bearings may be used to support the wheels.

In use, the two portions 10 and 23 and shaft 20 may be transported in the wrecker disassembled.

When the vehicle to be towed is reached, the portions 10 and 23 are assembled with the shaft 20 between them as shown in Figure 1. The portions 10 and 23 may be adjusted closer or further apart due to the slide action between the shaft guide 19 and the shaft 20.

The wrecker picks up one end of the vehicle and the dolly is rolled under two of the wheels and the wrecker then lowers the vehicle 31, so that the wheels rest on the arcuate portions 18 and 28. The wrecker then lifts the other end of the vehicle and tows it on the dolly. As shown in Figure 2 the dolly is generally pulled so that shaft 20 is toward the front. The car 31 would thus be towed to the right relative to Figure 2.

Staggering of the wheels 13 and 21 and 26 and 27 results in a very small turning moment on shaft 20 and no set screws need be used between the shaft guides and the shaft. That is to say that the bearing load from each wheel of the vehicle will be nearly balanced relative to each portion 10 and 23 so that the shaft 20 is not subjected to much turning moment.

In actual use, it has been determined that the vehicle does not need to be chained or locked to the dolly. Vehicles have been towed up to sixty-five miles an hour without coming out of the dolly.

It is seen that this invention provides an improved dolly for towing vehicles. Although it has been described with respect to a preferred embodiment, it is not to be so limited as changes and modifications may be made which are within the intended scope as defined by the appended claim.

What is claimed is:

A dolly for towing a motor vehicle comprising a pair of wheel-supporting portions, the wheel-suporting portions each formed with side walls curved outwardly at the top and a curved wheel-receiving pocket formed in each wheel-supporting portion, the rear of each wheel-supporting portion formed substantially vertical and the front end of each portion formed by a lower member extending forwardly from the wheel receiving pocket and an upper member secured to the upper end of the wheel receiving pocket opposite said substantially vertical portion and extending downwardly and forwardly therefrom and secured at its forward end to the forward end of said forwardly extending member, shaft guides attached to each wheel-supporting portion adjacent the forward end thereof, a shaft with its opposite ends detachably received within the shaft guides, a first pair of ground wheels rotatably attached to the first wheel-supporting portion at diagonally opposite corners with the wheel on the side of the shaft guide mounted at the rear of the wheel-supporting portion, and a second pair of ground wheels rotatably attached to the second wheel-supporting portion at diagonally opposite corners with the wheel on the side of the shaft guide mounted at the rear of the wheel-supporting structure.

References Cited in the file of this patent
UNITED STATES PATENTS

| | | |
|---|---|---|
| 216,687 | Lewis | June 17, 1879 |
| 1,224,574 | Sessions | May 1, 1917 |
| 1,379,250 | Clark | May 24, 1921 |
| 1,871,180 | Kegresse | Aug. 9, 1932 |
| 2,472,952 | Lennard | June 14, 1949 |
| 2,552,804 | Morris | May 15, 1951 |
| 2,610,750 | Hulbert | Sept. 16, 1952 |

FOREIGN PATENTS

| | | |
|---|---|---|
| 1,026,722 | France | Feb. 4, 1953 |
| 176,858 | Great Britain | Mar. 6, 1922 |